United States Patent
Challapalli et al.

(10) Patent No.: US 10,061,801 B2
(45) Date of Patent: Aug. 28, 2018

(54) CUSTOMIZE COLUMN SEQUENCE IN PROJECTION LIST OF SELECT QUERIES

(71) Applicant: International Business Machines Corporation, Armonk, NY (US)

(72) Inventors: Kiran Challapalli, Hyderabad (IN); Vaibhav S. Dantale, Pune (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/880,434

(22) Filed: Oct. 12, 2015

(65) Prior Publication Data

US 2017/0103097 A1 Apr. 13, 2017

(51) Int. Cl.
*G06F 17/30* (2006.01)

(52) U.S. Cl.
CPC .. *G06F 17/30418* (2013.01); *G06F 17/30483* (2013.01)

(58) Field of Classification Search
CPC ............... G06F 17/30418; G06F 17/30483
See application file for complete search history.

(56) References Cited

U.S. PATENT DOCUMENTS

| 8,825,629 | B2 | 9/2014 | Lawande et al. | |
|---|---|---|---|---|
| 2002/0029209 | A1* | 3/2002 | Bernal | G06F 17/30595 |
| 2013/0086019 | A1* | 4/2013 | Dantale | G06F 17/30554 |
| | | | | 707/705 |

OTHER PUBLICATIONS

Tilanus, et al; "Custom Sequence of Rows and Columns in PROC TABULATE"; SAS Global Forum 2011; Coders' Corner; Paper 085-2011; pp. 1-4.
"Rename or reorder the columns in the External Data window"; Microsoft Office; Printed May 26, 2015; p. 1; <https://support.office.com/en-IN/article/rename-or-reorder-the-columns-in-the-external-data-window-b39a9a0b-f09f-4d20-a629-1ea52195e98e>.
"Rearrange the order of columns in a table"; Microsoft Office; Printed May 26, 2015; p. 1; <https://support.office.com/en-in/article/Rearrange-the-order-of-columns-in-a-table-d1701654-fe43-4ae3-adbc-29ee03a97054>.
Bhallapalli et al., "Customize col. Sequence in Projection List of Select Queries" U.S. Appl. No. 15/620,994, filed Jun. 13, 2017, 22 pages.
IBM, List of IBM Patent Applications Treated as Related, Appendix P, dated Jun. 13, 2017, 2 pages.

* cited by examiner

*Primary Examiner* — Cam-Y Truong
(74) *Attorney, Agent, or Firm* — Edward J. Wixted, III (57) ABSTRACT

In an approach for manipulating columns in a projection list in a database result set, a processor receives a database request having a projection operation for a plurality of columns in one or more tables, wherein the projection operation comprises a SELECT statement having a column list that includes having (a) a shorthand that specifies the plurality of columns and (b) a column sequence clause that specifies a column name from the plurality of columns and a resulting column position. A processor retrieves data records having the plurality of columns including the specified column name and the resulting column position. A processor generates a result set comprised of the data records having the plurality of columns, such that for the result set, values within the specified column name are inserted into the result set at the resulting column position.

10 Claims, 4 Drawing Sheets

SELECT *
FROM TAB2
                                                    ～350

| COLP | COLA | COLB | COLC | COLD | COLE |~370
|------|------|------|------|------|------|
| X1   | 9    | Y1   | 10   | AZ   | TRUE |
| X2   | 18   | Y2   | 20   | BY   | FALSE|
| X3   | 27   | Y3   | 30   | CX   | TRUE |
| X4   | 36   | Y4   | 40   | DW   | FALSE|

360 ~ (rows)   380 (columns)

FIG. 3B

SELECT TAB1.* , COL_SEQUENCE (TAB2.COLB,3)
FROM TAB1, TAB2 WHERE TAB1.COL1=TAB2.COLP
                                                    ～400

| COL1 | COL2 | COLB | COL3 | COL4  | COL5 |~420
|------|------|------|------|-------|------|
| X1   | AB   | Y1   | 2    | FALSE | Z1   |
| X2   | CD   | Y2   | 4    | TRUE  | Z2   |
| X3   | EF   | Y3   | 6    | FALSE | Z3   |
| X4   | GH   | Y4   | 8    | TRUE  | Z4   |

410 ~ (rows)   430 (columns)

CUSTOMIZE COLUMN SEQUENCE IN PROJECTION LIST OF SELECT QUERIES

BACKGROUND

The present invention relates generally to the field of database management, and more particularly to manipulating columns in a projection list in a database result set.

A database is an organized collection of data. A database is the collection of schemes, tables, queries, reports, views, and other objects. The data is typically organized to model aspects of reality in a way that supports processes requiring information, such as modelling the availability of rooms in hotels in a way that supports finding a hotel with vacancies.

A database management system (DBMS) is a computer software application that interacts with a user, other applications, and the database itself to capture and analyze data. A general-purpose DBMS is designed to allow the definition, creation, querying, update, and administration of databases. A database is not generally portable across different DBMSs, but different DBMSs can interoperate by using standards, such as structured query language (SQL) and open database connectivity (ODBC) to allow a single application to work with more than one DBMS.

SUMMARY

Aspects of an embodiment of the present invention disclose a method, computer program product, and computing system for manipulating columns in a projection list in a database result set. A processor receives a database request having a projection operation for a plurality of columns in one or more tables, wherein the projection operation comprises a SELECT statement having a column list that includes having (a) a shorthand that specifies the plurality of columns and (b) a column sequence clause that specifies a column name from the plurality of columns and a resulting column position. A processor retrieves data records having the plurality of columns including the specified column name and the resulting column position. A processor generates a result set comprised of the data records having the plurality of columns, such that for the result set, values within the specified column name are inserted into the result set at the resulting column position.

DETAILED DESCRIPTION

Embodiments of the present invention provide techniques for providing a column sequence function in a projection list of a database query, where the column sequence function specifies a column name and a resulting column position. The column sequence function reorders, or manipulates, columns in a resulting dataset. In one embodiment, the syntax for the described column sequence function may be as follows: col_sequence(col_name, col_position).

Embodiments of the present invention will now be described in detail with reference to the Figures.

Figure 1:
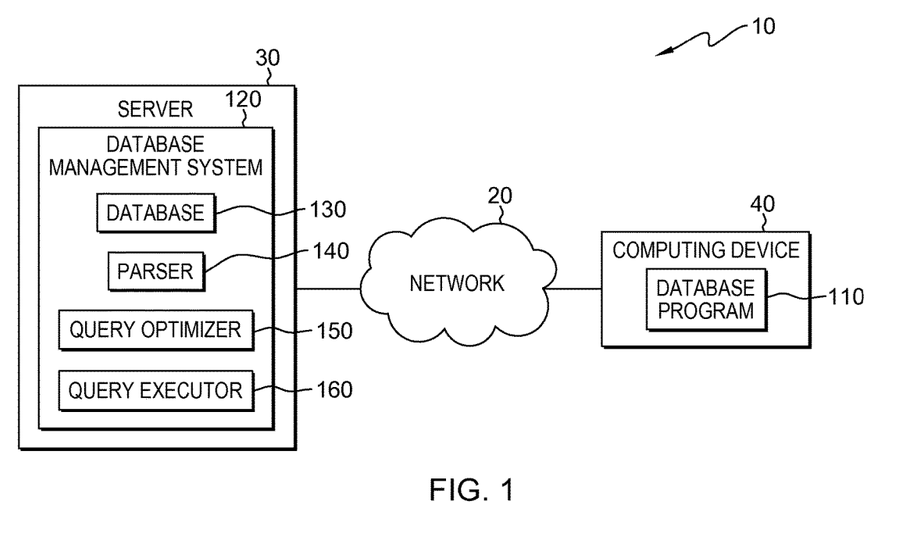
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains database management system (DBMS) 120, database 130, parser 140, query optimizer 150, and query executor 160. In other embodiments, server 30 may include components, as depicted and described in further detail with respect to FIG. 5.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains database program 110. In other embodiments, computing device 40 may include components, as depicted and described in further detail with respect to FIG. 5.

Database program 110 represents any software application capable of submitting a database query to DBMS 120. For example, database program 110 could be a software application configured to allow users to generate and submit database queries. As another example, database program 110 could be a software application configured to submit one or more predefined database queries to DBMS 120. In the depicted embodiment, database program 110 resides on computing device 40. In other embodiments, database program 110 may reside on another computing device, another server, or server 30, provided that database program 110 can access DBMS 120 and database 130 via network 20.

DBMS 120 is a computer software application that interacts with a user, other applications, and the database itself to capture and analyze data. DBMS 120 contains database 130, parser 140, query optimizer 150, and query executor 160. In the depicted embodiment, DBMS 120 resides on server 30. In other embodiments, DBMS 120 may reside on another server, computing device, or computing device 40, provided that DBMS 120 is accessible to database program 110 and can access database 130, parser 140, query optimizer 150, and query executor 160 via network 20.

Database 130 may be a repository that may be written to by database program 110 or read by DBMS 120. In one embodiment, a program (not shown) may allow a user to define various database queries and store to database 130. In some embodiments, database program 110 may define various database queries and store to database 130. In other embodiments, database 130 may contain a plurality of records (i.e., data) and is managed by DBMS 120. In the depicted embodiment, database 130 resides in DBMS 120 on server 30. In other embodiments, database 130 may reside alone on another server, computing device, or computing device 40, provided that database 130 is accessible to database program 110 and DBMS 120 via network 20.

Parser 140 is configured to parse the query based on a predetermined syntax to generate a data structure (i.e., parse tree or query tree), representing components of the query separated into a tree format for quicker handling and processing. In one embodiment, the predetermined syntax may include a grammar provision specifying a projection list that may include a column sequence clause having a plurality of arguments. The plurality of arguments specify a target column position to be manipulated and a corresponding column with which to manipulate. The predetermined syntax may include one or more key words reserved for providing the column sequence functionality described herein. In one embodiment, the key word COLUMN_SEQUENCE may be reserved for specifying a column sequence clause. In some embodiments, the key word COL_SEQUENCE may be reserved for specifying a column sequence clause. In the depicted embodiment, parser 140 resides in DBMS 120 on server 30. In other embodiments, parser 140 may reside alone on another server, computing device, or computing device 40, provided that parser 140 is accessible to DBMS 120 via network 20.

Query optimizer 150 is configured to evaluate a variety of possible plans for executing the query and select a query plan that efficiently executes the received database query. Query optimizer 150 may, for example, determine that building an index for a table will help the query run faster. A database index is generally a data structure that allows data in the database (e.g., in a table) to be located and accessed more efficiently. Query optimizer 150 may then generate the index, which can be used in both the processing of the current query and in processing subsequent queries against the table as well. In the depicted embodiment, query optimizer 150 resides in DBMS 120 on server 30. In other embodiments, query optimizer 150 may reside alone on another server, computing device, or computing device 40, provided that query optimizer 150 is accessible to DBMS 120 via network 20.

Query executor 160 is generally configured to convert the query execution plan into a series of instructions for implementing the query. The instructions may include one or more procedural calls to lower-level functions, such as access methods, for retrieving the requested data from the database.

After the query execution plan has been executed by the query executor 160, a result dataset may be generated by the query executor 160 that includes one or more data records requested by the database query. DBMS 120 returns the result dataset back to the requesting database program 110.

In one embodiment, query executor 160 is configured to execute a projection operation having a column sequence operation by locating a specified column in a first data record (e.g., a table) and manipulating a second data record to include the specified column in the first data record at a specified column position in the second data record. In one embodiment, query executor 160 includes a column sequence access method configured to implement techniques for manipulating columns in a result set as described herein. The column sequence access method may accept a target column position and a column name as input. The column sequence access method may be configured to, for each data record retrieved by query executor 160, manipulate one data record by inserting a column from another data record into a specified column position of the first data record.

The column sequence function enables a developer to specify a manipulated result set without having to enumerate every column in a projection list, thereby providing ease of development and reducing human error during development. Additionally, the column sequence function reduces the instability and maintenance of a query by reducing the likelihood that a change in the order of table columns would necessitate a corresponding change in the query. In the depicted embodiment, query executor 160 resides in DBMS 120 on server 30. In other embodiments, query executor 160 may reside alone on another server, computing device, or computing device 40, provided that query executor 160 is accessible to DBMS 120 via network 20.

Figure 2:
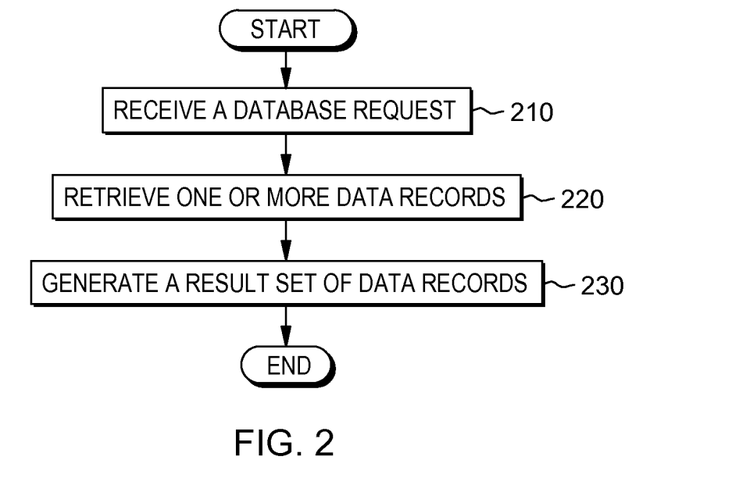
FIG. 2 depicts a flowchart of the steps of a database management system, executing within the computing system of FIG. 1, for manipulating columns in a projection list in a database result set, in accordance with an embodiment of the present invention.

FIG. 2 depicts a flowchart 200 of the steps of a DBMS, executing within the computing system of FIG. 1, in accordance with an embodiment of the present invention. DBMS 120 manipulates columns in a projection list in a database result set.

In step 210, DBMS 120 receives a database request having a column sequence clause that specifies a column name and a resulting column position. In one embodiment, the column name includes the data record (e.g., table) from which the column originates. For example, column 9 from table 4 could have a column name of tab4.col9.

In one embodiment, the database request, or query, includes a SELECT statement, having a column list from one or more data records that includes the plurality of columns and the column sequence clause. The column list may include a wildcard (e.g., "*" or Kleene star) that expands to specify the plurality of columns. In one embodiment, the column sequence clause includes a COL_SEQUENCE key word and a comma-delimited argument list that includes a column name and a resulting column position.

In step 220, DBMS 120 retrieves one or more data records having a plurality of columns including the specified column name and resulting column position.

In step 230, DBMS 120 generates a result set comprised of data records, such that, for each data record, a value for the specified resulting column position is replaced with the value within the corresponding specified column name. In other words, the column of the specified column name is inserted into the resulting column position of the result set.

Implementation of steps 210 through 230 are described in more detail above in FIG. 1, and examples of steps 210 through 230 are elaborated below in FIGS. 3 and 4.

Figure 3A:
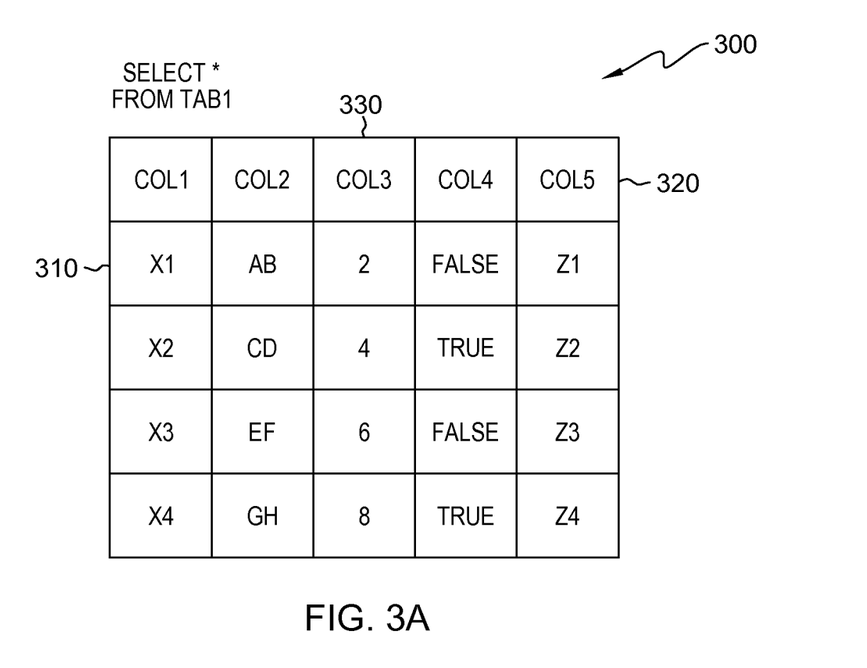
FIG. 3A illustrates a database result set for which a plurality of columns is returned, in accordance with an embodiment of the present invention.

FIG. 3A illustrates a database result set 300 for which a plurality of columns is returned, in accordance with an embodiment of the present invention. DBMS 120 may execute a database query and return database result set 300, which includes a plurality of data records 310 and columns 320. Column 330 will be manipulated below in FIG. 4. In this particular example, DBMS 120 may execute a database query "SELECT* FROM tab1" to produce database result set 300, having all rows of the entity tab1. As depicted, the result set 300 includes the columns identified as COL1, COL2, COL3, COL4, and COL5, having various data types, such as string, Boolean, and numeric values.

Figure 3B:
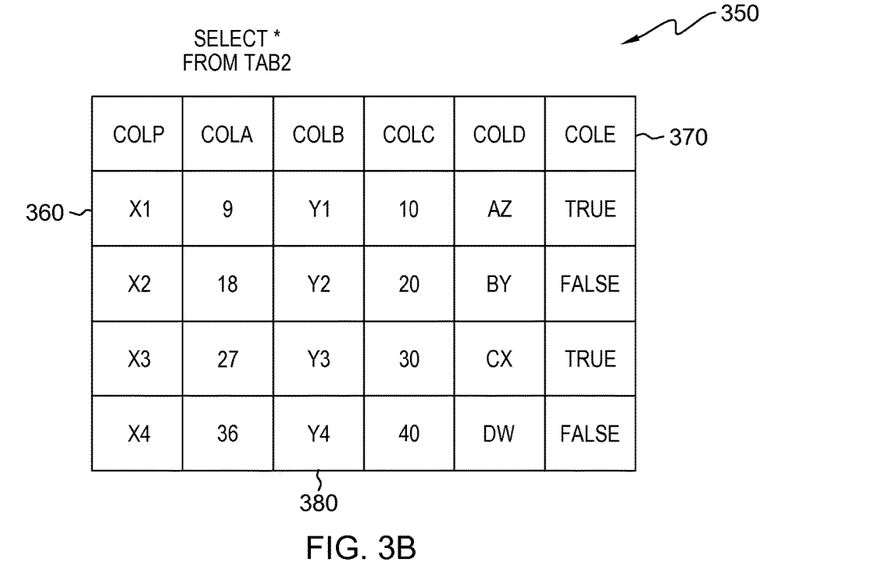
FIG. 3B illustrates a database result set for which a plurality of columns is returned, in accordance with an embodiment of the present invention.

FIG. 3B illustrates a database result set 350 for which a plurality of columns is returned, in accordance with an embodiment of the present invention. DBMS 120 may execute a database query and return database result set 350, which includes a plurality of data records 360 and columns 370. Column 380 will be manipulated below in FIG. 4. In this particular example, DBMS 120 may execute a database query "SELECT* FROM tab2" to produce the result set 350, having all rows of the entity tab2. As depicted, the result set 350 includes the columns identified as COLP, COLA, COLB, COLC, COLD, and COLE, having various data types, such as string, Boolean, and numeric values.

In some cases, a developer may want to manipulate the order of columns in one or more of the columns 320 and 370 and retrieve the output of that manipulation, rather than the order of the columns in result sets 300 and 350. In other words, a developer may wish to receive a result set, wherein the result of the manipulation changes column position while including columns from multiple data sets. In one example, a developer wishes to insert COLB from tab2 into the third column position of tab1. Using conventional techniques known to one skilled in the art, the developer can utilize a database query such as "SELECT tab1.COL1, tab1.COL2, tab2.COLB, tab1.COL3, tab1.COL4, tab1.COL5 FROM tab1, tab2" to produce the desired result.

However, in cases where a table includes many columns, conventional techniques known to those skilled in the art are cumbersome and tedious for developers. To retrieve all columns of a first table and one column of a second table and that the one column from the second table needs to be in a particular column position in the result set, conventional techniques require a developer to enumerate each column name in a projection list. For example, if the entity tab1 mentioned above had 50 columns, a developer would have to utilize a database query such as "SELECT tab1.COL1, tab1.COL2, tab2.COLB, tab1.COL3, tab1.COL4, tab1.COL5, . . . , tab1.COL49, tab1.COL50 FROM tab1, tab2" to produce the desired result set. This approach increases development time, and requires that developers be meticulous in the order of the columns while writing a database query and/or application. If a developer changes the order of the columns or removes columns in the entity, corresponding changes to database queries will be necessary to prevent database errors, thereby increasing the fragility of the database query.

Figure 4:
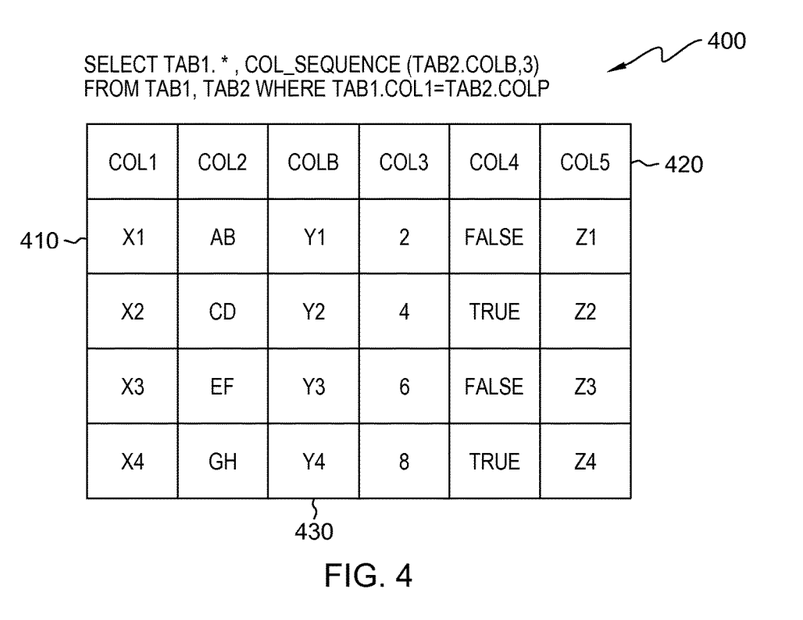
FIG. 4 illustrates a database result set for which a plurality of columns is manipulated, in accordance with an embodiment of the present invention.

FIG. 4 illustrates a database result set 400 for which a plurality of columns is manipulated, in accordance with an embodiment of the present invention. Similar to above, the DBMS 120 may execute a database query and return database result set 400, which includes a plurality of data records 410 and columns 420. Embodiments of the present invention provide a syntactical technique for manipulating the order of columns from multiple data sets (e.g., tables) to achieve a particular sequence of columns in a result set.

In one embodiment, the result set 400 includes a plurality of columns 420, wherein the values of column 430 have been inserted from tab2 into tab1 to achieve a particular sequence of columns in the result set 400. In the depicted embodiment, the DBMS 120 may execute a database query "SELECT tab1.*, col_sequence(tab2.COLB, 3) FROM tab1, tab2 WHERE tab1.COL1=tab2.COLP" and generate the result set 400, wherein the values of the column 380, or COLB, from tab2 have been inserted into tab1 where the values of the column 330, or COL3, were previously and the remainder of the columns from tab1 continue in the previous order (i.e., COLB is inserted into tab1 between COL2 and COL3 and the other columns from tab1 remain in the same order). As such, rather than having five columns with COL3 in the third column position, as seen in result set 300 of FIG. 3A, the result set 400 includes six columns with COLB inserted into the third column position, placing COL3 in the fourth column position, COL4 in the fifth column position, and COL5 in the sixth column position.

Figure 5:
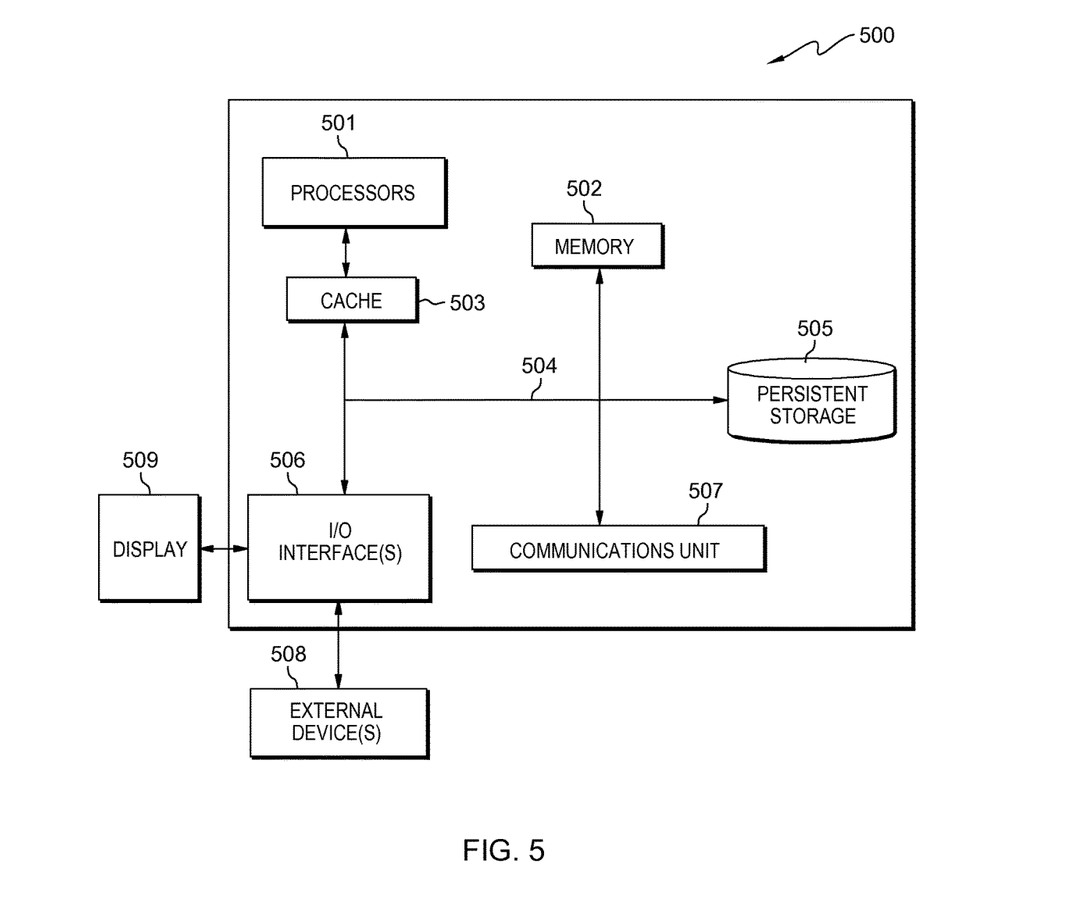
FIG. 5 depicts a block diagram of components of the server and the computing device of FIG. 1, in accordance with an embodiment of the present invention.

In FIG. 5, environment 500 depicts computer system 500, which is an example of a system that includes components of server 30 and/or computing device 40. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Database management system 120, database 130, parser 140, query optimizer 150, and query executor 160 may be downloaded to persistent storage 505 of server 30 through communications unit 507 of server 30. Database program 110 may be downloaded to persistent storage 505 of computing device 40 through communications unit 507 of computing device 40.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., database management system 120, database 130, parser 140, query optimizer 150, and query executor 160, can be stored on such portable computer readable storage media and can be loaded onto persistent storage 505 of server 30 via I/O interface(s) 506 of server 30. Software and data used to practice embodiments of the present invention, e.g., database program 110, can be stored on such portable computer readable storage media and can be loaded onto persistent storage 505 of computing device 40 via I/O interface(s) 506 of computing device 40. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for manipulating columns in a projection list in a database result set, the computer program product comprising:
   one or more non-transitory computer readable storage media and program instructions stored on the one or more non-transitory computer readable storage media, the program instructions that are executed by one or more processors of a computer server comprising:
   program instructions to receive from a computing device via a network a database request having a projection operation for a plurality of columns in one or more tables, wherein the projection operation comprises a SELECT statement having a column list that includes (a) a shorthand that specifies the plurality of columns and (b) a column sequence clause that specifies a column name from the plurality of columns and a resulting column position, the shorthand being less than a plurality of column references to the plurality of columns;
   program instructions to parse the database request, based on a predetermined syntax to generate a data structure representing components of the database request separated into a tree format; wherein the predetermined syntax includes a grammar provision specifying a projection list that includes the column sequence clause having a plurality of arguments and one or more key words reserved for providing the column sequence clause; wherein the plurality of arguments specifies a target column position to be manipulated by specifying changing an order of the plurality of columns and a corresponding column;
   program instructions to retrieve data records having the column sequence clause and the plurality of columns including, at least, the specified column name and the resulting column position, based on the projection operation, wherein the column sequence clause includes a comma-delimited argument list that includes, at least, a column reference to the specified column name and the resulting column position;
   program instructions to receive a plurality of plans configured to execute a database query;
   program instructions to determine a plan within the plurality of plans to efficiently execute the database query, wherein the plan includes the generated data structure; and subsequent to determining the plan to efficiently execute the database query, program instructions to execute the database query, using the determined plan, wherein executing the database query comprises; program instructions to generate a result set comprised of the data records having the plurality of columns, such that for the result set, values within the specified column name are inserted into the result set at the resulting column position, wherein a number of columns in the result set is the number of the plurality of columns in the one or more tables specified by the shorthand plus a number of columns to be inserted into the result set; and
   program instructions to return via the network, the result set to the computing device.

2. The computer program product of claim 1, wherein the column sequence clause includes, at least, a column sequence key.

3. The computer program product of claim 1, wherein the specified column name includes, at least, information identifying a table of origin.

4. The computer program product of claim 1, wherein the specified column name includes, at least, information identifying a name of a column within a table of origin.

5. The computer program product of claim 1, wherein the resulting column position is a column position within the generated result set that is manipulated by the column sequence clause.

6. A computer system for manipulating columns in a projection list in a database result set, the computer system comprising:
   one or more computer processors, one or more computer readable storage media, and program instructions stored on the computer readable storage media for execution by at least one of the one or more processors, the program instructions comprising:
   program instructions to receive from a computing device via a network a database request having a projection operation for a plurality of columns in one or more tables, wherein the projection operation comprises a SELECT statement having a column list that includes (a) a shorthand that specifies the plurality of columns and (b) a column sequence clause that specifies a column name from the plurality of columns and a resulting column position, the shorthand being less than a plurality of column references to the plurality of columns;

program instructions to parse the database request, based on a predetermined syntax to generate a data structure representing components of the database request separated into a tree format, wherein the predetermined syntax includes a grammar provision specifying a projection list that includes the column sequence clause having a plurality of arguments and one or more key words reserved for providing the column sequence clause, wherein the plurality of arguments specifies a target column position to be manipulated by specifying changing an order of the plurality of columns and a corresponding column;

program instructions to retrieve data records having the column sequence clause and the plurality of columns including, at least, the specified column name and the resulting column position, based on the projection operation, wherein the column sequence clause includes a comma-delimited argument list that includes, at least, a column reference to the specified column name and the resulting column position;

program instructions to receive a plurality of plans configured to execute a database query;

program instructions to determine a plan within the plurality of plans to efficiently execute the database query, wherein the plan includes the generated data structure; and subsequent to determining the plan to efficiently execute the database query, program instructions to execute the database query, using the determined plan, wherein executing the database query comprises: program instructions to generate a result set comprised of the data records having the plurality of columns, such that for the result set, values within the specified column name are inserted into the result set at the resulting column position, wherein a number of columns in the result set is the number of the plurality of columns in the one or more tables specified by the shorthand plus a number of columns to be inserted into the result set; and program instructions to return via the network, the result set to the computing device.

7. The computer system of claim 6, wherein the column sequence clause includes, at least; a column sequence key word.

8. The computer system of claim 6, wherein the specified column name includes, at least, information identifying a table of origin.

9. The computer system of claim 6, wherein the specified column name includes, at least, information identifying a name of a column within a table of origin.

10. The computer system of claim 6, wherein the resulting column position is a column position within the generated result set that is manipulated by the column sequence clause.

* * * * *